United States Patent
Li et al.

(10) Patent No.: US 12,510,796 B1
(45) Date of Patent: Dec. 30, 2025

(54) LIQUID CRYSTAL ON SILICON LOADING APPARATUS, LIQUID CRYSTAL ON SILICON COMPONENT, AND LIQUID CRYSTAL ON SILICON MODULATION METHOD

(71) Applicant: HUAWEI TECHNOLOGIES CO., LTD., Shenzhen (CN)

(72) Inventors: Tong Li, Shenzhen (CN); Liangjia Zong, Dongguan (CN); Hong Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 621 days.

(21) Appl. No.: 17/959,339

(22) Filed: Oct. 4, 2022

Related U.S. Application Data

(63) Continuation of application No. PCT/CN2021/083209, filed on Mar. 26, 2021.

(30) Foreign Application Priority Data

Apr. 8, 2020 (CN) .......................... 202010270002.8

(51) Int. Cl.
*G02F 1/31* (2006.01)
*G02F 1/1362* (2006.01)

(52) U.S. Cl.
CPC .......... *G02F 1/31* (2013.01); *G02F 1/136277* (2013.01); *G02F 2202/10* (2013.01)

(58) Field of Classification Search
CPC ............. G09G 3/3625; G09G 2300/08; G09G 2310/0202; G09G 3/18
See application file for complete search history.

(56) References Cited

U.S. PATENT DOCUMENTS

| | | | |
|---|---|---|---|
| 2002/0154102 A1* | 10/2002 | Huston | G09G 5/36 345/204 |
| 2003/0090478 A1* | 5/2003 | McKnight | G09G 3/3648 345/204 |
| 2015/0188656 A1* | 7/2015 | Sakurai | G02B 6/356 398/49 |

FOREIGN PATENT DOCUMENTS

| | | |
|---|---|---|
| CN | 105589506 A | 5/2016 |
| JP | H09212140 A | 8/1997 |
| JP | 2009025505 A | 2/2009 |

(Continued)

OTHER PUBLICATIONS

Korean Office Action issued in corresponding Korean Application No. 10-2022-7037516, dated Jul. 11, 2023, pp. 1-16.

(Continued)

*Primary Examiner* — Kevin M Nguyen
(74) *Attorney, Agent, or Firm* — HAUPTMAN HAM, LLP

(57) ABSTRACT

An LCOS loading apparatus, an LCOS component, and an LCOS modulation method are provided. The LCOS loading apparatus includes: a control logic unit, configured to obtain address information and data information, where the address information indicates an address of a pixel with a to-be-updated voltage, and the data information includes voltage data of the pixel with a to-be-updated voltage; and a primary memory, configured to: obtain the address information and the data information from the control logic unit, and load corresponding voltage data in the data information based on the address indicated by the address information.

20 Claims, 5 Drawing Sheets

(56) References Cited

FOREIGN PATENT DOCUMENTS

| | | |
|---|---|---|
| KR | 20030024280 A | 3/2003 |
| KR | 20170113011 A | 10/2017 |

OTHER PUBLICATIONS

Japanese Office Action issued in corresponding Japanese Application No. 2022-561601, dated Oct. 10, 2023, pp. 1-9.

* cited by examiner

|    | λ0 | λ1 | ... | ... | ... | ... | ... | ... | ... | ... | λ126 | λ127 |
|----|----|----|----|----|----|----|----|----|----|----|----|----|
| P0 |    | 0  |    |    |    |    |    |    |    |    |    |    |
| P1 |    |    |    |    |    |    |    |    |    |    |    |    |
| P2 |    |    | 1  |    | ... |    |    |    | ... |    |    |    |
| P3 |    |    |    |    |    | ... |    |    |    |    |    |    |
| P4 |    |    |    |    |    |    |    |    |    |    | ... |    |
| P5 |    |    | ... |    |    |    |    |    |    |    |    |    |
| P6 |    |    |    |    |    | ... |    |    |    |    |    |    |
| P7 |    |    |    |    |    |    | 22 | 23 |    |    |    |    |

# LIQUID CRYSTAL ON SILICON LOADING APPARATUS, LIQUID CRYSTAL ON SILICON COMPONENT, AND LIQUID CRYSTAL ON SILICON MODULATION METHOD

CROSS-REFERENCE TO RELATED APPLICATIONS

This application is a continuation of International Application No. PCT/CN2021/083209, filed on Mar. 26, 2021, which claims priority to Chinese Patent Application No. 202010270002.8, filed on Apr. 8, 2020. The disclosures of the aforementioned applications are hereby incorporated by reference in their entireties.

BACKGROUND

When a liquid crystal on silicon (LCOS) technology and a component thereof are used in a wavelength selective switch (WSS) product, a status of a liquid crystal material of each pixel on the LCOS component flickers with a pixel voltage at a specific frequency.

Currently, a driving mechanism of a digital LCOS is to use a pulse width modulation (PWM) square wave to generate an equivalent voltage of a changed root-mean-square (RMS) value, to drive pixels on the LCOS component to obtain phase changes of different grayscale values. The LCOS component specifically loads and modulates voltage data in a bitplane manner. In an existing solution, when the voltage data is loaded into a primary memory in a bitplane manner, a plurality of clock cycles are occupied to load the voltage data in a whole version (voltage data of all pixels), and loading duration is fixed and relatively long. When being modulated in a secondary memory, the voltage data is also modulated in the whole version, and modulation time is long. As a result, voltages of the pixels are updated relatively slow, and a period of a PWM waveform is relatively long. Consequently, a phase flicker of an optical signal passing through these pixels increases, which affects performance of an optical communication system.

SUMMARY

At least one embodiment provides a liquid crystal on silicon loading apparatus, a liquid crystal on silicon component, and a liquid crystal on silicon modulation method, to reduce phase flickers of an optical signal on a pixel, thereby improving performance of an optical communication system.

According to at least one embodiment, an LCOS loading apparatus is provided, including: a control logic unit, configured to obtain address information and data information, where the address information indicates an address of a pixel with a to-be-updated voltage, and the data information includes voltage data of the pixel with a to-be-updated voltage; and a primary memory, configured to obtain the address information and the data information from the control logic unit, and load corresponding voltage data in the data information based on the address indicated by the address information.

The LCOS loading apparatus is also referred to as an LCOS loading module, or referred to as an LCOS chip.

It is understood that data is transmitted between the primary memory and the control logic unit by using an internal data bus. The control logic unit is implemented based on a memory and a communication interface (for example, an LCOS interface).

In addition to obtaining voltage data of a pixel, the LCOS loading apparatus in at least one embodiment further obtains an address of a pixel with a to-be-updated voltage, and loads corresponding voltage data based on the address of the pixel with a to-be-updated voltage, instead of loading voltage data of all pixels, so that data loading duration is shortened, and voltage update and modulation duration is further shortened, to reduce phase flickers of an optical signal on a pixel, thereby improving performance of an optical communication system.

In at least one embodiment, the address information is input into the control logic unit in a first clock cycle by using the data bus, and the data information is input into the control logic unit in a second clock cycle by using the data bus. In at least one embodiment, both the address information and the data information are received without modifying a structure of an existing LCOS interface or increasing a quantity of LCOS interfaces, so that at least one embodiment reduces costs and is compatible with a previous LCOS modulation module.

In at least one embodiment at least one embodiment, the control logic unit is further configured to obtain an operation control signal, where the operation control signal indicates whether the address information or the data information is obtained by the control logic unit in a current clock cycle. In at least one embodiment, the operation control signal with an indication function specifically indicates specific information that is exactly received by the LCOS interface in the current clock cycle, to prevent an error in an information transmission and parsing process.

In at least one embodiment, a plurality of pixels with a to-be-updated voltage share the address information, and the plurality of pixels with a to-be-updated voltage are located in a plurality of adjacent columns in a first row. The address information includes a shared row address and a shared column address, the shared row address indicates a row sequence number of the first row, and the shared column address indicates a column sequence number shared by the plurality of pixels with a to-be-updated voltage. In at least one embodiment, the plurality of pixels with a to-be-updated voltage that share the address information is loaded in one clock cycle, so that addressing and data loading is efficiently performed in this address information compiling manner.

In at least one embodiment, bits of the data information are in a one-to-one correspondence with the plurality of pixels with a to-be-updated voltage that share the address information. In at least one embodiment, the address information is compiled in a manner in which the bits of the data information are in a one-to-one correspondence with the plurality of pixels with a to-be-updated voltage, so that an address and data are efficiently transmitted, thereby helping efficiently performing addressing and data loading.

In at least one embodiment, the control logic unit is further configured to send a write control signal to the primary memory, where the write control signal indicates the primary memory to write the corresponding voltage data in the data information based on the address indicated by the address information. In at least one embodiment, the control logic unit sends the write control signal to indicate, to the primary memory, that the address information and the corresponding data information are prepared and data is loaded, to reduce a probability of an error occurred in data loading.

According to at least one embodiment, an LCOS modulation apparatus is provided. The LCOS modulation apparatus includes the LCOS loading apparatus in and in at least one embodiment, a modulator, configured to obtain loaded voltage data from the primary memory, and modulate a pixel with a to-be-updated voltage.

The LCOS modulation apparatus is also referred to as an LCOS modulation module or an LCOS chip.

According to at least one embodiment, an LCOS component is provided, including: a silicon-based backplane including the LCOS modulation apparatus, a pixel array modulated by the LCOS modulation apparatus, a liquid crystal layer, an electrode layer located between the pixel array and the liquid crystal layer, and a glass cover located above the liquid crystal layer. The LCOS modulation apparatus applies a voltage of a modulated pixel to the liquid crystal layer by using the electrode layer. The glass cover is configured to protect the liquid crystal layer and enable an optical signal to pass through.

In at least one embodiment, the LCOS component further includes an external functional module, configured to determine and send address information and data information to a control logic unit.

According to at least one embodiment, an LCOS chip is provided, including: a silicon-based backplane, where the silicon-based backplane includes the LCOS modulation apparatus; a pixel array; and an electrode layer.

According to at least one embodiment, a wavelength selective switch WSS is provided. The WSS includes the LCOS component, S input ports, and T output ports. An optical signal is input from at least one of the S input ports, and is output from at least one of the T output ports after being selected by the LCOS component. S and T are positive integers, and at least one of S and T is greater than 1.

According to at least one embodiment, an optical communication system is provided, where the optical communication system includes the WSS. The optical communication system further includes devices such as an optical transmitter, an optical fiber, a repeater, and an optical receiver. The WSS is at any proper location in the optical communication system, and is configured to switch, upload, or download an optical signal.

According to at least one embodiment, an LCOS modulation method is provided, including: obtaining address information and data information, where the address information indicates an address of a pixel with a to-be-updated voltage, and the data information includes voltage data of the pixel with a to-be-updated voltage; loading corresponding voltage data in the data information based on the address indicated by the address information; and modulating the pixel with a to-be-updated voltage based on the loaded voltage data.

In at least one embodiment, the obtaining address information and data information includes: obtaining the address information in a first clock cycle by using a data bus, and obtaining the data information in a second clock cycle by using the data bus.

In at least one embodiment, the method further includes: obtaining an operation control signal, where the operation control signal indicates whether the address information or the data information is obtained in a current clock cycle.

In at least one embodiment, a plurality of pixels with a to-be-updated voltage share the address information, and the plurality of pixels with a to-be-updated voltage are located in a plurality of adjacent columns in a first row. The address information includes a shared row address and a shared column address, the shared row address indicates a row sequence number of the first row, and the shared column address indicates a column sequence number shared by the plurality of pixels with a to-be-updated voltage.

In at least one embodiment, bits of the data information are in a one-to-one correspondence with the plurality of pixels with a to-be-updated voltage that share the address information.

DESCRIPTION OF EMBODIMENTS

The following describes technical solutions are made with reference to accompanying drawings.

Figure 1:
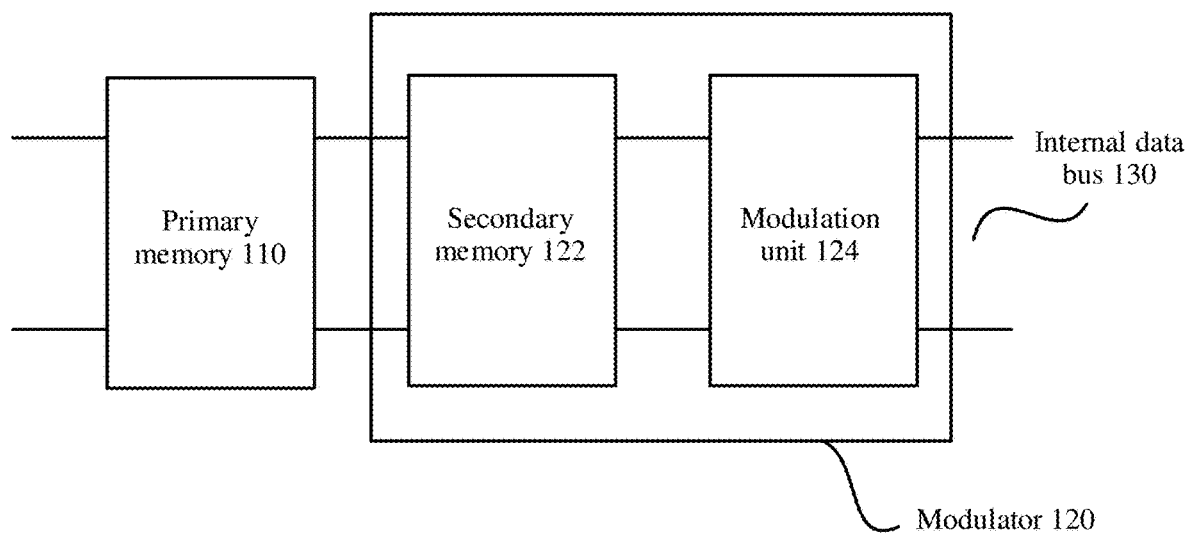
FIG. 1 is a schematic diagram of a structure of an LCOS modulation module.

Currently, a driving mechanism of a digital LCOS is to use a PWM square wave to generate an equivalent voltage of a changed RMS value, to drive pixels in a pixel array on the LCOS component to obtain phase changes of different grayscale values. A PWM square wave of each pixel includes voltage data of M bits, and the $N^{th}$ bits of voltage data of all the pixels form a bitplane N, which is abbreviated herein as BP_N. 1-bit voltage data of each pixel on any bitplane is either a high voltage (for example, the high voltage is represented by 1) or a low voltage (for example, the low voltage is represented by 0). FIG. 1 is a schematic diagram of a structure of a modulation apparatus, or referred to as a modulation module 100, of an LCOS component (which is referred to as an LCOS modulation module for short). The LCOS modulation module 100 shown in FIG. 1 is configured to drive an LCOS component whose resolution is 1952×1088. The LCOS modulation module 100 includes a primary memory 110 of 1952×1088 bits that is configured to read and buffer voltage data and a modulator 120 configured to perform modulation. The modulator 120 includes a secondary memory 122 of 1952×1088 bits and a modulation unit 124 configured to modulate pixels of 1952×1088 bits. The LCOS modulation module further includes an internal data bus 130 configured to transmit data of 1952×1088 bits.

The voltage data on the bitplane N, namely, BP_N, that includes the $N^{th}$ bits of all the pixels is modulated in the modulator 120. The voltage data is transmitted from the primary memory 110 to the secondary memory 122 extremely quickly, and the voltage data enters the modulation unit 124 for modulation at the same time. The foregoing modulation uses a relatively long time. To improve processing efficiency of the LCOS modulation module, the voltage data is loaded and modulated at the same time. Therefore, after the voltage data on BP_N is transmitted from the primary memory 110 to the secondary memory 122, all voltage data of a bitplane N+1, namely, BP_N+1, that includes the $(N+1)^{th}$ bits of all the pixels is loaded into the primary memory 110 by using the data bus 130. It is understood that, due to a limitation of a data bit width, a process of loading the voltage data is also relatively long. To be specific, generally, the $(N+1)^{th}$ bits of voltage data is not loaded once but is loaded several times. Therefore, duration for loading the voltage data into the primary memory is fixed and relatively long.

Figure 2:
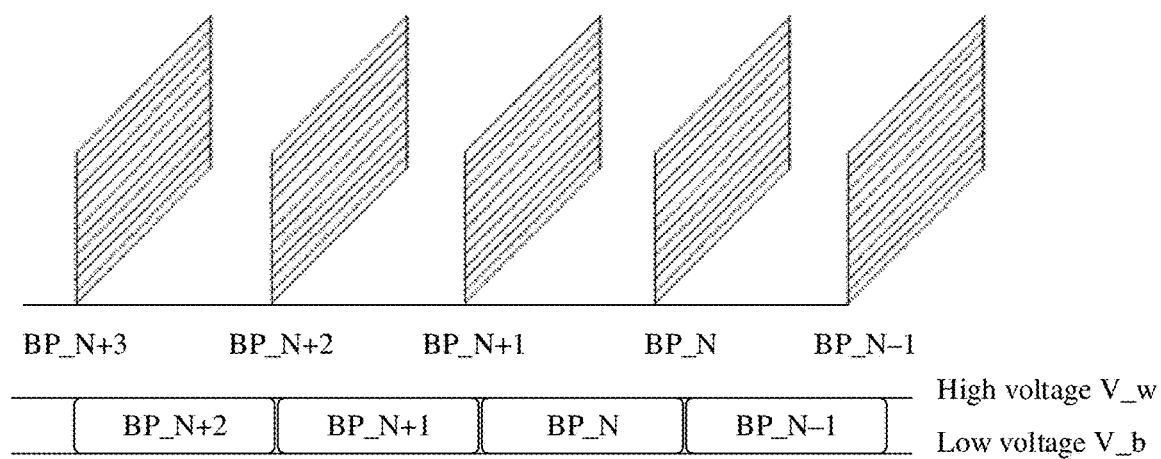
FIG. 2 is a schematic diagram of a sequence of voltage data loading, maintenance, and switching.

FIG. 2 is a schematic diagram of a sequence of voltage data loading, maintenance, and switching. As shown in FIG. 2, voltage data of all pixels on a bitplane is updated together, for example, voltage data on BP_N, BP_N+1, BP_N+2, BP_N+3, and BP_N+4 is loaded and modulated in a whole version (all pixels). In response to being loaded into the primary memory in a bitplane manner, the voltage data is loaded in a whole version, loading duration is fixed and relatively long, and 200 us is used to load voltage data of 1952×1088 pixels. The voltage data is loaded in a one-to-one correspondence with the pixel, without additional information. In response to being modulated in the secondary memory, the voltage data is also modulated in the whole version, and modulation time is also relatively long. As a result, voltages of the pixels are updated relatively slow, and a period of a PWM waveform is relatively long. Consequently, a phase flicker of an optical signal passing through these pixels increases, which affects performance of an optical communication system.

Figures 3, 4:
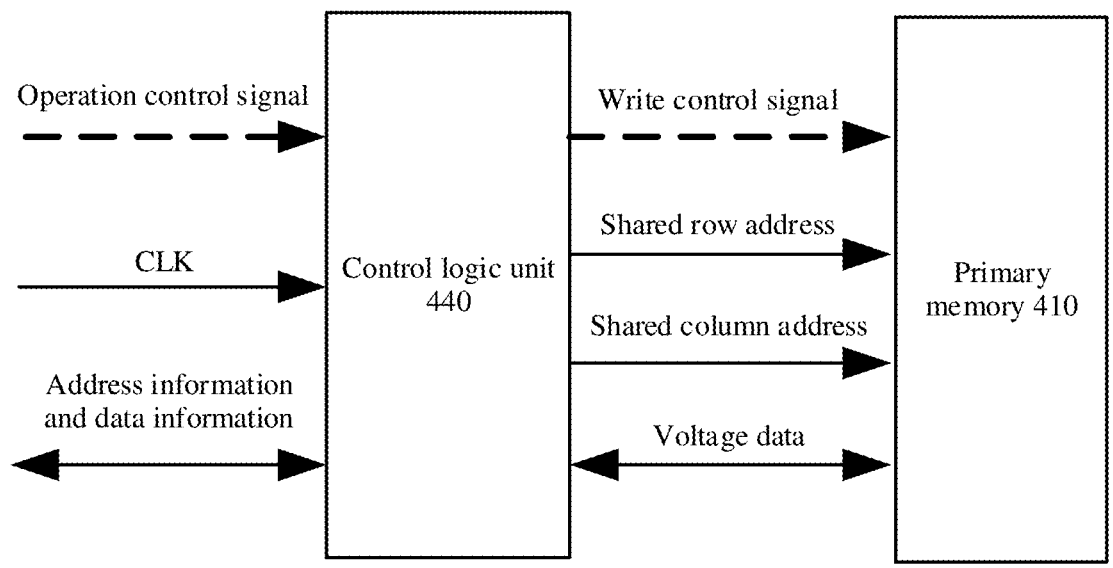
FIG. 3 is a schematic diagram of an actually used pixel region and an unused pixel region.
FIG. 4 is a schematic block diagram of an LCOS loading apparatus according to an embodiment disclosed herein.

However, compared with an LCOS display component, during application of a WSS, the LCOS component performs switching control on only a small proportion and quantity of wavelengths, and correspondingly, voltage of only a relatively small proportion and quantity of pixels is periodically controlled to maintain a specific PWM waveform. FIG. 3 is a schematic diagram of an actually used pixel region and an unused pixel region. An example shown in FIG. 3 corresponds to the foregoing example of application of the WSS. There are 1952×1088 pixels in total, which are divided into 12×8 (a total of eight rows from P0 to P7 and a total of 128 columns from 20 to 2127) pixel regions. Each pixel region includes 16×136 pixels, and there is no pixel in the last six columns of pixel regions. A pixel region denoted by a black box (for example, 24 pixel regions shown in FIG. 3) is a region that includes an actually used pixel through which an optical signal passes, and a pixel region denoted by a white box is a region that includes an unused pixel through which no optical signal passes. Ranges of a black box region and a white box region slightly vary with time, and a change frequency is even several to dozens of times per year. Therefore, in this embodiment, it is assumed that a voltage of the pixel in the pixel region denoted by the black box is updated at a relatively high frequency, and a voltage of the pixel in the pixel region denoted by the white box is updated at a relatively low frequency.

Based on the foregoing problem, at least one embodiment provides an LCOS loading apparatus, which is also referred to as an LCOS loading module, or is referred to as an LCOS chip. FIG. 4 is a schematic block diagram of an LCOS loading apparatus 400 according to an embodiment. As shown in FIG. 4, the LCOS loading apparatus 400 includes: a control logic unit 440, configured to obtain address information and data information, where the address information indicates an address of a pixat el with a to-be-updated voltage, and the data information includes voltage data of the pixel with a to-be-updated voltage; and a primary memory 410, configured to obtain the address information and the data information from the control logic unit 440, and load corresponding voltage data in the data information based on the address indicated by the address information.

In addition to obtaining voltage data of a pixel, the LCOS loading apparatus in this embodiment further obtains an address of a pixel with a to-be-updated voltage, and loads corresponding voltage data based on the address of the pixel with a to-be-updated voltage, instead of loading voltage data of all pixels, so that data loading duration is shortened, and voltage update and modulation duration is further shortened, to reduce phase flickers of an optical signal on a pixel, thereby improving performance of an optical communication system.

Although no data transmission manner is mentioned in the LCOS loading apparatus 400, it is understood that, in each embodiment, data is transmitted between the primary memory and the control logic unit by using an internal data bus. However, such is not limited.

It is understood that the control logic unit 440 is implemented based on a memory and a communication interface (for example, an LCOS interface). The control logic unit 440 is obtain the address information and the data information from the outside of the LCOS loading apparatus through the LCOS interface. However, such is not limited.

In some embodiments, the address information and the data information is from an external functional module outside the LCOS loading apparatus. Correspondingly, the external functional module is configured to determine and send the address information and the data information to the control logic unit 440. The external functional module determines specific pixel regions in which pixels are actually used pixels through which an optical signal passes, and specific pixel regions in which pixels are unused pixels through which no optical signal passes. The external functional module further compiles address information for a pixel with a to-be-updated voltage. The external functional module further determines data information for the pixel with a to-be-updated voltage. In addition, the external functional module further determines a voltage update frequency of an actually used pixel through which an optical signal passes, and a voltage update frequency of an unused pixel through which no optical signal passes. The external functional module further determines whether a voltage of an actually used pixel through which an optical signal passes or a voltage of an unused pixel through which no optical signal passes is updated in specific voltage update. The external functional module further has more functions. However, such is not limited.

In some embodiments, the external functional module further provides a clock signal, such as CLK shown in FIG. 4, to the LCOS loading apparatus 400 to perform clock alignment. There are one or more clock signals, for example, there are two clock signals. In response to two clock signals being used, data transmission efficiency is improved.

In some embodiments, the address information is input into the control logic unit 440 in a first clock cycle by using a data bus, and the data information is input into the control logic unit 440 in a second clock cycle by using the data bus. In other words, the address information and the data information are input into the control logic unit in different clock cycles by using a same data bus.

It is understood that the data bus is an external data bus of the LCOS loading apparatus 400. The address information and the data information are sent by the external functional module to the control logic unit 440 by using the data bus.

In a specific example, the control logic unit 440 obtains the address information (ADDRESS [31:0]) and the data information (DATA [31:0]) from the external functional module by using a data bus whose bit width is 32 bits. To facilitate information processing, the address information and the data information is transmitted in different clock cycles. For example, the control logic unit 440 receives address information in a current clock cycle by using the data bus whose bit width is 32 bits, and receives, in a next clock cycle by still using the data bus, data information of pixels in the address indicated by the address information, to obtain voltage data of these pixels. Then data is loaded and modulated. In this embodiment, both the address information and the data information are received without modifying a structure of an existing LCOS interface or increasing a quantity of LCOS interfaces, so that this embodiment reduces costs and is compatible with a previous LCOS modulation module.

It is understood that, in another embodiment, the address information and the data information is separately and simultaneously received by using different data buses, or both the address information and the data information is received in a same clock cycle by using a data bus. Such is not limited.

In some embodiments of this application, the control logic unit 440 is further configured to obtain an operation (OP) control signal, where the operation control signal indicates whether the address information or the data information is obtained by the control logic unit in a current clock cycle. This embodiment is corresponding to the foregoing described case in which the address information and the data information are input into the control logic unit in different clock cycles by using a same data bus. In this embodiment, the operation control signal that has 1 bit, 2 bits, or several bits, and that has an indication function specifically indicates specific information that is exactly received by the LCOS interface in the current clock cycle, to prevent an error in an information transmission and parsing process.

Optionally, the operation control signal has 2 bits (OP [1:0]). In a specific example, the operation control signal is 10 indicates that the control logic unit obtains the address information in the current clock cycle; or the operation control signal is 11 indicates that the control logic unit obtains the data information in the current clock cycle. To be compatible with an existing expression of the operation control signal, the operation control signal is 00 indicates that voltage data of a new bitplane currently starts to be processed: or the operation control signal is 01 indicates that voltage data of a new row of pixels currently starts to be processed. It is understood that the foregoing representation method is merely example description, and is not intended to limit this embodiment.

In some embodiments, a plurality of pixels with a to-be-updated voltage share the address information, and the plurality of pixels with a to-be-updated voltage are located in a plurality of adjacent columns in a first row. The address information includes a shared row address and a shared column address, the shared row address indicates a row sequence number of the first row, and the shared column address indicates a column sequence number shared by the plurality of pixels with a to-be-updated voltage. It is understood that the first row herein is a specific row in a plurality of rows. In other words, in these embodiments, pixels with a to-be-updated voltage in a plurality of adjacent columns in a same row share same address information. The address information includes a shared row address and a shared column address, the shared row address indicates a row sequence number shared by the pixels with a to-be-updated voltage in the plurality of adjacent columns in the same row, and the shared column address indicates a column sequence number shared by the pixels with a to-be-updated voltage in the plurality of adjacent columns in the same row. In these embodiments, the plurality of pixels with a to-be-updated voltage that share the address information is loaded in one clock cycle, so that addressing and data loading is efficiently performed in this address information compiling manner.

In a specific example, voltage data of a plurality of pixels with a to-be-updated voltage is loaded in one clock cycle. Voltage data of pixels with a to-be-updated voltage in several adjacent columns in a same row is selected to be loaded in one clock cycle. In this case, the address information is divided into two parts: a shared row address and a shared column address, which respectively indicate a row in which these pixels are located and a column sequence number shared by these pixels. A quantity of pixels whose voltage data is loaded in one clock cycle is equal to a quantity of bits of the data information. In other words, the bits of the data information are in a one-to-one correspondence with a plurality of pixels with a to-be-updated voltage that share the address information: or the bits of the data information are in a one-to-one correspondence with a plurality of pixels with a to-be-updated voltage that are in a plurality of adjacent columns in a same row and that share a column address. In this specific example, the plurality of pixels with a to-be-updated voltage that share the address information is loaded in one clock cycle, so that addressing and data loading is efficiently performed in this address information compiling manner.

In one case, a quantity of a plurality of pixels with a to-be-updated voltage that are in a plurality of adjacent columns in a same row and that share a column address, a quantity of bits of the data information, and a bit width of a data bus for reading the data information are equal to each other. For example, a pixel region 22 and a pixel region 23 shown in FIG. 3 include 32×136 (136 rows and 32 columns) pixels in total, and the bit width of the data bus is 32 bits. 32 pixels in each row share one piece of address information, that is, the 32 pixels share one shared row address and share one shared column address, and voltage data is loaded into the primary memory 410 in one clock cycle.

In another case, a quantity of a plurality of pixels with a to-be-updated voltage that are in a plurality of adjacent columns in a same row and that share a column address is equal to a quantity of bits of the data information, and both of the quantities are less than a bit width of a data bus for reading the data information, that is, not all of the bit width of the data bus is used. For example, a pixel region 0 or a pixel region 1 shown in FIG. 3 includes 16×136 (136 rows and 16 columns) pixels in total, and the bit width of the data bus is 32 bits. 16 pixels in each row share one piece of address information, that is, the 16 pixels share one shared row address and share one shared column address, and 16 bits of the data bus are occupied in one clock cycle to load voltage data into the primary memory 410. The remaining 16 bits of the data bus are idle, or are used to place the address information. Such is not limited.

In some embodiments, the control logic unit 440 is further configured to send a write control signal to the primary memory 410, where the write control signal indicates the primary memory 410 to write the corresponding voltage data in the data information based on the address indicated by the address information. Based on a specific use case, the write control signal has 1 bit or includes more bits. It is understood that in response to, in some embodiments, the address information and the data information not being transmitted to the control logic unit 440 in a same clock cycle, the data information is not continuously input into the primary memory 410. In this case, the control logic unit 440 sends the write control signal to the primary memory 410 to indicate, to the primary memory 410, that the address information and the corresponding data information are prepared and data is loaded. In this way, a probability of an error occurred in data loading is reduced. In response to loading the voltage data, the primary memory 410 controls a write pointer to move to the address, write the data information into rea corresponding address register, and then control the pointer to move and change a row.

Some embodiments further provide an LCOS modulation apparatus, which is also referred to as an LCOS modulation module. The LCOS modulation apparatus includes the LCOS loading apparatus described above, and a modulator, configured to obtain loaded voltage data from the primary memory, and modulate a pixel with a to-be-updated voltage.

Figure 5:
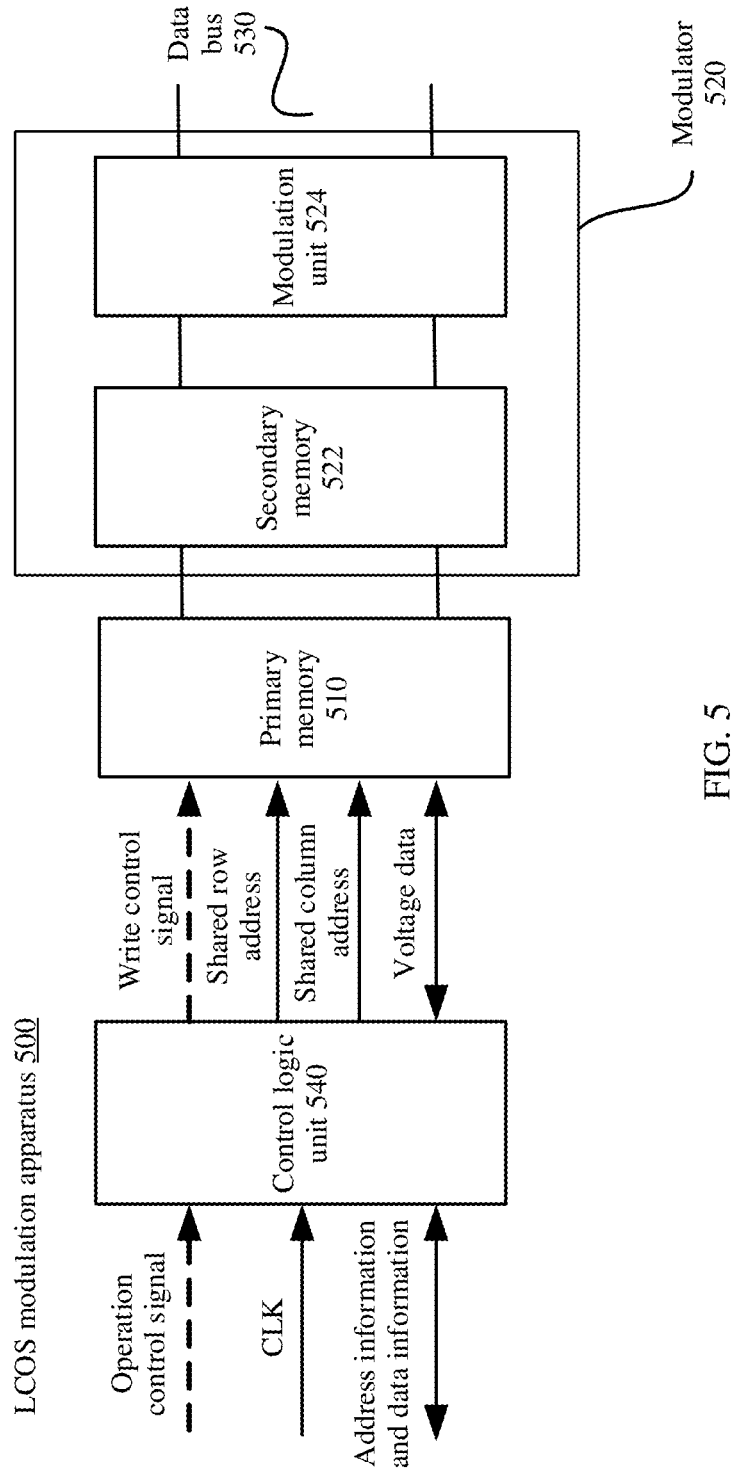
FIG. 5 is a schematic block diagram of an LCOS modulation apparatus according to an embodiment disclosed herein.

FIG. 5 is a schematic block diagram of an LCOS modulation apparatus 500 according to an embodiment. As shown in FIG. 5, corresponding to the LCOS loading apparatus 400 in FIG. 4, the LCOS modulation apparatus 500 includes: a control logic unit 540, configured to obtain address information and data information, where the address information indicates an address of a pixel with a to-be-updated voltage, and the data information includes voltage data of the pixel with a to-be-updated voltage: a primary memory 510, configured to obtain the address information and the data information from the control logic unit 540, and load corresponding voltage data in the data information based on the address indicated by the address information; and a modulator 520, configured to obtain the loaded voltage data from the primary memory 510, and modulate the pixel with a to-be-updated voltage.

In addition to obtaining voltage data of a pixel, the LCOS modulation apparatus in this embodiment further obtains an address of a pixel with a to-be-updated voltage, and loads corresponding voltage data based on the address of the pixel with a to-be-updated voltage and modulates the voltage data, instead of loading and modulating voltage data of all pixels, so that voltage update and modulation duration is shortened, to reduce phase flickers of an optical signal on a pixel, thereby improving performance of an optical communication system.

It is understood that the control logic unit 540 in the LCOS modulation apparatus 500 corresponds to the control logic unit 440 described above, and the primary memory 510 corresponds to the primary memory 410 described above. Specific functions and embodiments of the control logic unit 540 and the primary memory 510 are not described in detail herein again. Although no data transmission manner is mentioned in the LCOS modulation apparatus 500, it is understood that, in each embodiment, data is transmitted between the primary memory, the modulator, and the control logic unit by using an internal data bus 530. Such is not limited.

In some embodiments, the modulator adds voltage data to a liquid crystal material of each pixel to implement a function of an LCOS component. The modulator 520 includes a secondary memory 522 and a modulation unit 524. Functions of the secondary memory 522 and the modulation unit 524 are similar to those of the secondary memory 122 and the modulation unit 124 in FIG. 1, and details are not described herein again. A difference lies in the following: The secondary memory 122 and the modulation unit 124 respectively store and modulate all pixels on a bitplane, and the secondary memory 522 and the modulation unit 524 respectively store and modulate a pixel with a to-be-updated voltage on the bitplane.

It is understood that a data bit width of the data bus, a quantity of bits of the operation control signal, a quantity of bits of the write control signal, a quantity of bits of the address information, a quantity of rows and columns of pixels on each bitplane, a quantity of pixel regions, and the like described in the embodiments are merely examples, and not intended to be limiting.

An experimental result shows that, in a case of a same quantity of pixels, compared with a solution in which voltage data of all pixels is updated each time, the sum of loading and modulation time are reduced by more than 10 times, so that corresponding optical phase flickers are significantly reduced, thereby greatly improving performance of an optical communication system.

Some embodiments further provide an LCOS component. The LCOS component includes: a silicon-based backplane including the LCOS modulation apparatus described above, a pixel array modulated by the LCOS modulation apparatus, a liquid crystal layer, an electrode layer located between the pixel array and the liquid crystal layer, and a glass cover located above the liquid crystal layer. The LCOS modulation apparatus applies a voltage of a modulated pixel to the liquid crystal layer by using the electrode layer. The glass cover is configured to protect the liquid crystal layer and enable an optical signal to pass through.

Figure 7:
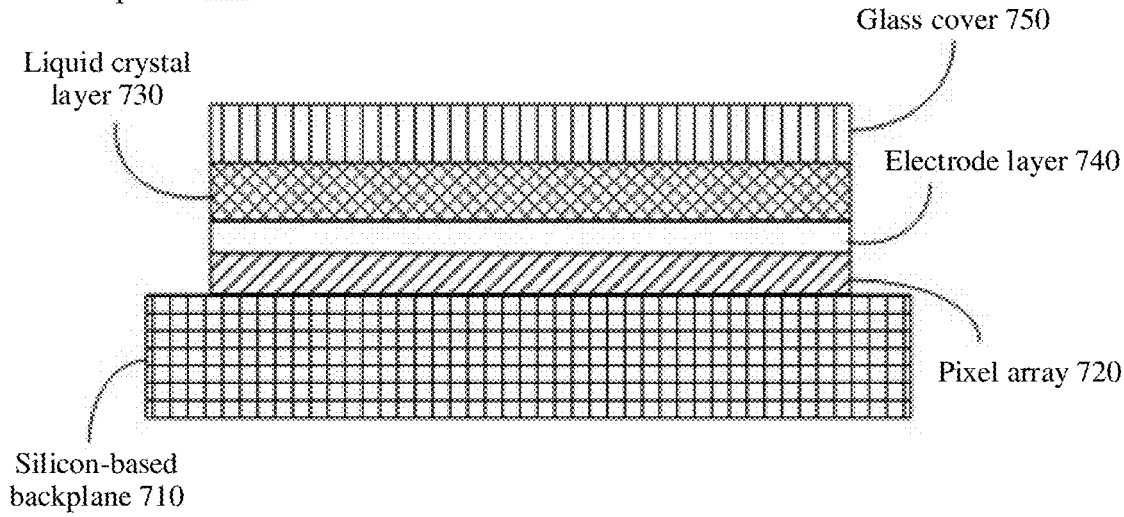
FIG. 7 is a schematic diagram of a structure of an LCOS component according to an embodiment disclosed herein.

FIG. 7 is a schematic diagram of a structure of an LCOS component 700 according to an embodiment. As shown in FIG. 7, the LCOS component 700 includes: a silicon-based backplane 710 including an LCOS modulation apparatus, a pixel array 720 modulated by the LCOS modulation apparatus, a liquid crystal layer 730, an electrode layer 740 located between the pixel array 720 and the liquid crystal layer 730, and a glass cover 750 located above the liquid crystal layer 730. The pixel array 720 is an aluminum layer, for example, includes 1952×1088 pixels. A modulator of the LCOS modulation apparatus modulates the pixel in the pixel array 720 and applies a voltage of a modulated pixel to the liquid crystal layer 730 by using the electrode layer 740. The liquid crystal layer includes a guide material, and the guide material fixes an arrangement direction of liquid crystal molecules in response to a voltage being zero. A surface that is of the glass cover and that is close to the liquid crystal layer includes a conductive layer. The conductive layer is, for example, an indium tin oxide (ITO) layer. The conductive layer has good conductivity and transparency, and is configured to enable an optical signal to pass through and perform conduction. It is understood that dimensions, locations, specific forms, and the like of the silicon-based backplane 710, the pixel array 720, the liquid crystal layer 730, the electrode layer 740, and the glass cover 750 in FIG. 7 are all examples, and does not constitute a limitation.

Optionally, the LCOS component further includes the external functional module described above configured to complete the foregoing function.

Some embodiments further provide an LCOS chip, including: a silicon-based backplane, where the silicon-based backplane includes the LCOS modulation apparatus described above: a pixel array; and an electrode layer.

Some embodiments further provide a wavelength selective switch WSS, where the WSS includes the LCOS component described above, S input ports, and T output ports. An optical signal is input from at least one of the S input ports, and is output from at least one of the T output ports after being selected by the LCOS component. S and T are positive integers, and at least one of S and T is greater than 1.

Figure 8:
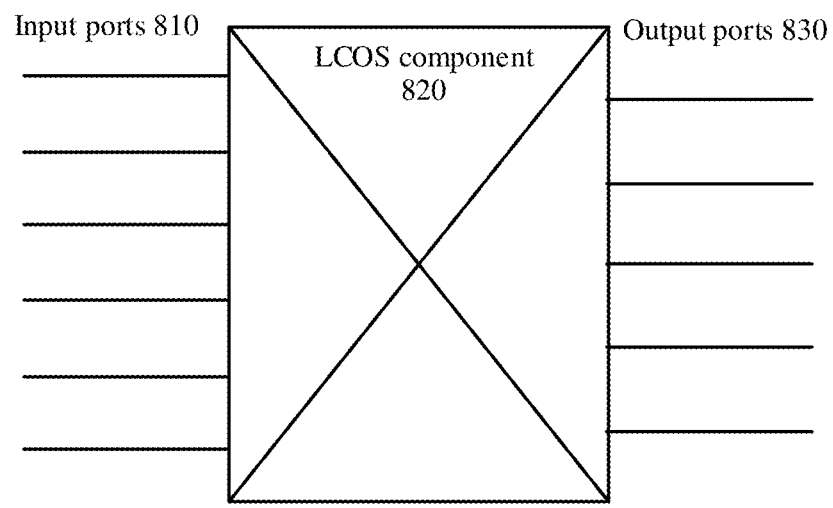
FIG. 8 is a schematic diagram of a structure of a WSS according to an embodiment disclosed herein.

FIG. 8 is a schematic diagram of a structure of a WSS 800 according to an embodiment. As shown in FIG. 8, the WSS 800 includes S input ports 810, an LCOS component 820, and T output ports 830. An optical signal is input from at least one of the S input ports 810, and is output from at least one of the T output ports 830 after being selected by the LCOS component 820, to change a transmission direction of the optical signal, for example, switching, uploading, or downloading the optical signal. S is equal or unequal to T. Such is not limited.

It is understood that the WSS in this embodiment modulates a phase of an optical signal by using the LCOS component, to change a transmission direction of the optical signal.

Optionally, the S input ports and the T output ports are formed by optical fibers. The S input ports and the T output ports form an input/output optical fiber array.

Optionally, the WSS further includes a grating, which is located between the input port and the LCOS component and is configured to demultiplex optical signals of different wavelengths in space. Alternatively, the grating is a wavelength division multiplexer.

Optionally, the WSS further demultiplexes an optical signal in space on a liquid crystal panel based on a holographic technology.

Optionally, the WSS further includes a collimator, which is located between the input port and the grating and is configured to collimate an optical signal.

Optionally, the WSS further includes a lens configured to focus or collimate an optical signal.

The WSS further includes another component. Such is not limited.

Some embodiments further provide an optical communication system, where the optical communication system includes the WSS. The optical communication system further includes devices such as an optical transmitter, an optical fiber, a repeater, and an optical receiver.

The WSS is at any proper location in the optical communication system, and is configured to switch, upload, or download an optical signal.

Figure 6:
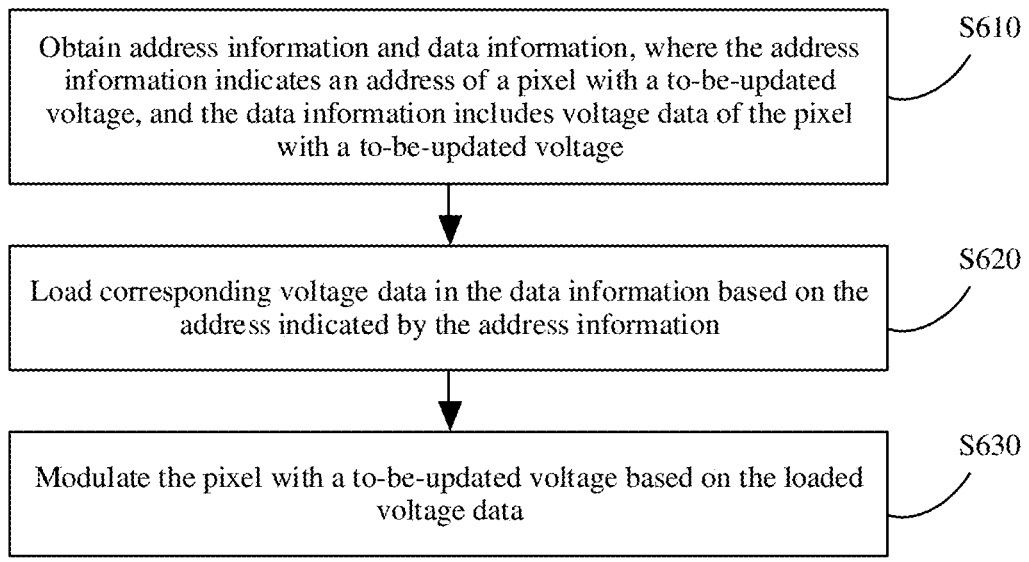
FIG. 6 is a schematic flowchart of an LCOS modulation method according to an embodiment disclosed herein.

Some embodiments further provide an LCOS modulation method. FIG. 6 is a schematic flowchart of an LCOS modulation method 600 according to an embodiment. The method 600 includes the following steps.

S610. Obtain address information and data information, where the address information indicates an address of a pixel with a to-be-updated voltage, and the data information includes voltage data of the pixel with a to-be-updated voltage.

S620: Load corresponding voltage data in the data information based on the address indicated by the address information.

S630: Modulate the pixel with a to-be-updated voltage based on the loaded voltage data.

In addition to obtaining voltage data of a pixel, the LCOS modulation method in this embodiment further obtains an address of a pixel with a to-be-updated voltage, and loads corresponding voltage data based on the address of the pixel with a to-be-updated voltage and modulates the voltage data, instead of loading and modulating voltage data of all pixels, so that voltage update and modulation duration is shortened, to reduce phase flickers of an optical signal on a pixel, thereby improving performance of an optical communication system.

In some embodiments, S610 of obtaining address information and data information includes: obtaining the address information in a first clock cycle by using a data bus, and obtaining the data information in a second clock cycle by using the data bus. In other words, the address information and the data information are obtained in different clock cycles by using a same data bus.

In some embodiments, the method 600 further includes: obtaining an operation control signal, where the operation control signal indicates whether the address information or the data information is obtained in a current clock cycle.

In some embodiments, a plurality of pixels with a to-be-updated voltage share the address information, and the plurality of pixels with a to-be-updated voltage are located in a plurality of adjacent columns in a first row. The address information includes a shared row address and a shared column address, the shared row address indicates a row sequence number of the first row, and the shared column address indicates a column sequence number shared by the plurality of pixels with a to-be-updated voltage. In other words, pixels with a to-be-updated voltage in a plurality of adjacent columns in a same row share same address information. The address information includes a shared row address and a shared column address, the shared row address indicates a row sequence number shared by the pixels with a to-be-updated voltage in the plurality of adjacent columns in the same row, and the shared column address indicates a column sequence number shared by the pixels with a to-be-updated voltage in the plurality of adjacent columns in the same row.

In some embodiments, bits of the data information are in a one-to-one correspondence with the plurality of pixels with a to-be-updated voltage that share the address information. In other words, the bits of the data information are in a one-to-one correspondence with a plurality of pixels with a to-be-updated voltage that are in a plurality of adjacent columns in a same row and that share a column address.

It is understood by a person skilled in the art that, for convenience and brevity of description, execution of the steps of the method described above are implemented based on a corresponding module, unit, and component in the foregoing product embodiment. Details are not described herein again.

It is understood that various numeric numbers in this specification are merely descriptions for convenient differentiation, and are not used to limit the scope of the embodiments disclosed.

It is understood that sequence numbers of the foregoing processes do not mean execution sequences in embodiments. The execution sequences of the processes is determined based on functions and internal logic of the processes, and does not be construed as any limitation on the processes of embodiments disclosed.

A person of ordinary skill in the art is aware that, in combination with the examples described in embodiments disclosed in this specification, units and algorithm steps are implemented by electronic hardware or a combination of computer software and electronic hardware. Whether the functions are performed by hardware or software depends on particular applications and design constraint conditions of the technical solutions. A person skilled in the art uses different methods to implement the described functions for each particular application, but it is not to be considered to go beyond the scope of the embodiments disclosed.

In the several embodiments, it is understood that the disclosed system, apparatus, and method are implemented in other manners. For example, the described apparatus embodiment is merely an example. For example, division into the units is merely logical function division and are other division in actual implementation. For example, a plurality of units or components are combined or integrated into another system, or some features are ignored or not performed. In addition, the displayed or discussed mutual couplings or direct couplings or communication connections are implemented by using some interfaces. The indirect couplings or communication connections between the apparatuses or units are implemented in electronic, mechanical, or other forms.

The units described as separate parts are or are not physically separate, and parts displayed as units are or are not physical units, are located in one position, or are distributed on a plurality of network units. Some or all of the units are selected based on actual use case to achieve the objectives of the solutions of embodiments.

In addition, functional units in embodiments are integrated into one processing unit, or each of the units exist alone physically, or two or more units are integrated into one unit.

In response to the functions are implemented in the form of a software functional unit and sold or used as an independent product, the functions are stored in a computer-readable storage medium. Based on such an understanding, the technical solutions of the embodiments essentially, or the part contributing to a current technology, or some of the technical solutions are implemented in a form of a software product. The computer software product is stored in a storage medium, and includes several instructions for instructing a computer device (e.g., a personal computer, a server, or a network device) to perform all or some of the steps of the methods described in embodiments. The foregoing storage medium includes any medium that stores program code, such as a USB flash drive, a removable hard disk, a read-only memory (ROM), a random access memory (RAM), a magnetic disk, or an optical disc.

The foregoing descriptions are merely specific examples of embodiments, but are not intended to limit the protection scope of the embodiments. Any variation or replacement readily figured out by a person skilled in the art within the technical scope disclosed shall fall within the protection scope of the embodiments. Therefore, the protection scope of the embodiments shall be subject to the protection scope of the claims.

What is claimed is:

1. A liquid crystal on silicon (LCOS) loading apparatus, comprising:
   a controller, configured to obtain address information and data information, wherein the address information is usable to indicate an address of a pixel with a to-be-updated voltage, and the data information comprises voltage data of the pixel with the to-be-updated voltage; and
   a primary memory, configured to obtain the address information and the data information from the controller, and load corresponding voltage data in the data information based on the address information.

2. The LCOS loading apparatus according to claim 1, wherein:
   the controller is configured to receive the address information in a first clock cycle using a data bus; and
   the controller is configured to receive the data information in a second clock cycle using the data bus.

3. The LCOS loading apparatus according to claim 1, wherein the controller is further configured to obtain an operation control signal, and the operation control signal is usable to indicate whether the address information or the data information is obtained by the controller in a current clock cycle.

4. The LCOS loading apparatus according to claim 1, wherein a plurality of pixels with the to-be-updated voltage share the address information, the plurality of pixels with the to-be-updated voltage are located in a plurality of adjacent columns in a first row, and the pixel is one of the plurality of pixels;
   the address information comprises a shared row address and a shared column address, the shared row address is usable to indicate a row sequence number of the first row, and the shared column address is usable to indicate a column sequence number shared by the plurality of pixels with the to-be-updated voltage, and
   the controller is configured to determine the shared row address and the shared column address based on the received address information, the shared row address indicates a first set of pixels of the plurality of pixels with the to-be-updated voltage having a same row address, and the shared column address indicates a second set of pixels of the plurality of pixels with the to-be-updated voltage having a same column address.

5. The LCOS loading apparatus according to claim 4, wherein bits of the data information are in a one-to-one correspondence with each pixel of the plurality of pixels with the to-be-updated voltage that share the address information.

6. The LCOS loading apparatus according to claim 1, wherein the controller is further configured to send a write control signal to the primary memory, and the write control signal is usable to indicate the primary memory to write the corresponding voltage data in the data information based on the address information.

7. A liquid crystal on silicon (LCOS) component, comprising:
   a LCOS modulation apparatus comprising a LCOS loading apparatus and a modulator;
   a silicon-based backplane comprising the LCOS modulation apparatus, a pixel array capable of being modulated by the LCOS modulation apparatus, a liquid crystal layer, an electrode layer between the pixel array and the liquid crystal layer, and a glass cover above the liquid crystal layer, wherein the LCOS modulation apparatus is configured to apply a voltage of a modulated pixel to the liquid crystal layer by using the electrode layer, and the glass cover is configured to protect the liquid crystal layer and enable an optical signal to pass through;
   wherein the LCOS loading apparatus comprises:
      a controller, configured to obtain address information and data information, wherein the address information is usable to indicate an address of a pixel with a to-be-updated voltage, and the data information comprises voltage data of the pixel with the to-be-updated voltage; and
      a primary memory, configured to obtain the address information and the data information from the controller, and load corresponding voltage data in the data information based on the address information;
   the modulator, configured to obtain loaded voltage data from the primary memory, and modulate a pixel with the to-be-updated voltage.

8. The LCOS component according to claim 7, the LCOS component further comprises an external processor, configured to determine and send address information and data information to the controller.

9. The LCOS component according to claim 7, wherein the controller is configured to receive the address information in a first clock cycle using a data bus; and
the controller is configured to receive the data information in a second clock cycle using the data bus.

10. The LCOS component according to claim 7, wherein the controller is further configured to obtain an operation control signal, and the operation control signal is usable to indicate whether the address information or the data information is obtained by the controller in a current clock cycle.

11. The LCOS component according to claim 7, wherein a plurality of pixels with the to-be-updated voltage share the address information, the plurality of pixels with the to-be-updated voltage are located in a plurality of adjacent columns in a first row, and the pixel is one of the plurality of pixels;
the address information comprises a shared row address and a shared column address, the shared row address is usable to indicate a row sequence number of the first row, and the shared column address is usable to indicate a column sequence number shared by the plurality of pixels with a to-be-updated voltage, and
the controller is configured to determine the shared row address and the shared column address based on the received address information, the shared row address indicates a first set of pixels of the plurality of pixels with the to-be-updated voltage having a same row address, and the shared column address indicates a second set of pixels of the plurality of pixels with the to-be-updated voltage having a same column address.

12. The LCOS component according to claim 11, wherein bits of the data information are in a one-to-one correspondence with the plurality of pixels with a to-be-updated voltage that share the address information.

13. A wavelength selective switch (WSS), comprising
a liquid crystal on silicon (LCOS) component, S number of input ports, and T number of output ports, wherein an optical signal is receivable by at least one of the S input ports, and is configured to be output from at least one of the T output ports after being selected by the LCOS component, wherein each of S and T are positive integers, and at least one of S or T is greater than 1;
wherein the LCOS component comprises:
a LCOS modulation apparatus comprising a LCOS loading apparatus and a modulator;
a silicon-based backplane comprising the LCOS modulation apparatus, a pixel array capable of being modulated by the LCOS modulation apparatus, a liquid crystal layer, an electrode layer between the pixel array and the liquid crystal layer, and a glass cover above the liquid crystal layer, wherein the LCOS modulation apparatus is configured to apply a voltage of a modulated pixel to the liquid crystal layer by using the electrode layer, and the glass cover is configured to protect the liquid crystal layer and enable an optical signal to pass through;
wherein the LCOS loading apparatus comprises:
a controller, configured to obtain address information and data information, wherein the address information is usable to indicate an address of a pixel with a to-be-updated voltage, and the data information comprises voltage data of the pixel with the to-be-updated voltage; and
a primary memory, configured to obtain the address information and the data information from the controller, and load corresponding voltage data in the data information based on the address information;
the modulator, configured to obtain loaded voltage data from the primary memory, and modulate a pixel with the to-be-updated voltage.

14. The WSS according to claim 13, wherein:
the controller is configured to receive the address information in a first clock cycle using a data bus; and
the controller is configured to receive the data information in a second clock cycle using the data bus.

15. The WSS according to claim 13, wherein the controller is further configured to obtain an operation control signal, and the operation control signal is usable to indicate whether the address information or the data information is obtained by the controller in a current clock cycle.

16. A liquid crystal on silicon (LCOS) modulation method, comprising:
obtaining address information and data information, wherein the address information is usable to an address of a pixel with a to-be-updated voltage, and the data information comprises voltage data of the pixel with the to-be-updated voltage;
loading corresponding voltage data in the data information based on the address information; and
modulating the pixel with the to-be-updated voltage based on the loaded voltage data.

17. The method according to claim 16, wherein the obtaining address information and data information comprises:
obtaining the address information in a first clock cycle by using a data bus; and
obtaining the data information in a second clock cycle by using the data bus.

18. The method according to claim 16, wherein the method further comprises:
obtaining an operation control signal, wherein the operation control signal is usable to indicate whether the address information or the data information is obtained in a current clock cycle.

19. The method according to claim 16, wherein
a plurality of pixels with the to-be-updated voltage share the address information, the plurality of pixels with the to-be-updated voltage are located in a plurality of adjacent columns in a first row, and the pixel is one of the plurality of pixels;
the address information comprises a shared row address and a shared column address, the shared row address is usable to indicate a row sequence number of the first row, and the shared column address is usable to indicate a column sequence number shared by the plurality of pixels with the to-be-updated voltage, and
the shared row address and the shared column address are based on the received address information, the shared row address indicates a first set of pixels of the plurality of pixels with the to-be-updated voltage having a same row address, and the shared column address indicates a second set of pixels of the plurality of pixels with the to-be-updated voltage having a same column address.

20. The method according to claim 19, wherein bits of the data information are in a one-to-one correspondence with each pixel of the plurality of pixels with the to-be-updated voltage that share the address information.

* * * * *